(12) United States Patent
Kennedy

(10) Patent No.: US 8,671,616 B2
(45) Date of Patent: Mar. 18, 2014

(54) BIOPOLYMER-BASED GROWTH MEDIA, AND METHODS OF MAKING AND USING SAME

(75) Inventor: T. Scott Kennedy, East Boothbay, ME (US)

(73) Assignee: Grow-Tech LLC, Lisbon Falls, ME (US)

( * ) Notice: Subject to any disclaimer, the term of this patent is extended or adjusted under 35 U.S.C. 154(b) by 0 days.

(21) Appl. No.: 13/060,130

(22) PCT Filed: Sep. 2, 2009

(86) PCT No.: PCT/US2009/055723
§ 371 (c)(1),
(2), (4) Date: May 24, 2011

(87) PCT Pub. No.: WO2010/028037
PCT Pub. Date: Mar. 11, 2010

(65) Prior Publication Data
US 2011/0232188 A1    Sep. 29, 2011

Related U.S. Application Data

(60) Provisional application No. 61/093,968, filed on Sep. 3, 2008.

(51) Int. Cl.
*A01G 31/00*    (2006.01)
(52) U.S. Cl.
USPC .............................. 47/59 S; 47/58.1 R; 47/74

(58) Field of Classification Search
USPC ............. 47/59 S, 62 N, 56, 58.1 R, 58.1 SC, 47/58.1 SE, 74; 264/54, 85, 103, 115, 118, 264/157, 331.18, 331.21
See application file for complete search history.

(56) References Cited

U.S. PATENT DOCUMENTS

| | | | |
|---|---|---|---|
| 3,046,178 A * | 7/1962 | Tupper | ........................ 156/167 |
| 3,849,241 A | 11/1974 | Butin et al. | |
| 5,053,482 A | 10/1991 | Tietz | |
| 5,097,004 A | 3/1992 | Gallagher et al. | |
| 5,097,005 A | 3/1992 | Tietz | |
| 5,213,881 A | 5/1993 | Timmons et al. | |
| 5,295,985 A | 3/1994 | Romesser et al. | |
| 5,972,265 A | 10/1999 | Marra et al. | |

(Continued)

FOREIGN PATENT DOCUMENTS

| | | |
|---|---|---|
| JP | 02117318 | 5/1990 |
| JP | 11166068 | 6/1999 |

(Continued)

OTHER PUBLICATIONS

English-language translation of JP 2008-148632 A.*

(Continued)

*Primary Examiner* — Rob Swiatek
*Assistant Examiner* — Lisa Tsang
(74) *Attorney, Agent, or Firm* — Pierce Atwood LLP; Kevin M. Farrell; David J. Wilson

(57) ABSTRACT

Compositions and methods that relate to a biopolymer medium for growing plants. In certain embodiments, the biopolymer growth medium comprises or consists essentially of polylactic acid (PLA), polyhydroxyalkanoate (PHA) or a mixture of them. Another aspect of the invention relates to a method of producing a biopolymer growth medium.

15 Claims, 11 Drawing Sheets

(56) References Cited

U.S. PATENT DOCUMENTS

| | | | |
|---|---|---|---|
| 5,997,781 A * | 12/1999 | Nishikawa et al. | 264/45.1 |
| 6,143,947 A | 11/2000 | Noda | |
| 7,011,778 B2 * | 3/2006 | Hansen et al. | 264/118 |
| 2003/0109605 A1 * | 6/2003 | Bond et al. | 524/47 |
| 2003/0144369 A1 * | 7/2003 | Marrelli | 521/50 |
| 2006/0070294 A1 * | 4/2006 | Spittle | 47/9 |
| 2006/0248795 A1 * | 11/2006 | Langezaal | 47/58.1 R |
| 2008/0202026 A1 * | 8/2008 | Bong Kyun | 47/56 |
| 2009/0019765 A1 * | 1/2009 | Kosinski et al. | 47/64 |
| 2009/0291607 A1 * | 11/2009 | Wang et al. | 442/382 |
| 2011/0189463 A1 * | 8/2011 | Moore et al. | 428/304.4 |

FOREIGN PATENT DOCUMENTS

| | | | | |
|---|---|---|---|---|
| JP | 11-275959 A | 10/1999 | | |
| JP | 2000060314 A | 2/2000 | | |
| JP | 2000232821 | 8/2000 | | |
| JP | 2003250346 A * | 9/2003 | | A01G 7/00 |
| JP | 2003250350 | 9/2003 | | |
| JP | 2003333928 A * | 11/2003 | | A01G 1/00 |
| JP | 2008-148632 A | 7/2008 | | |
| KR | 10-04090791 B1 | 5/2005 | | |
| WO | 02-076187 A2 | 10/2002 | | |
| WO | 2005-002318 A1 | 1/2005 | | |

OTHER PUBLICATIONS

English-language translation of JP 2003-250346.*
English-language translation of JP 2003-333928.*
Extended European Search Report for International Patent Application No. PCT/US2009/055723 issued May 14, 2012.

* cited by examiner

BIOPOLYMER-BASED GROWTH MEDIA, AND METHODS OF MAKING AND USING SAME

RELATED APPLICATION

This application claims the benefit of priority to U.S. Provisional Patent Application Ser. No. 61/093,968, filed Sep. 3, 2008; the contents of which is hereby incorporated by reference.

BACKGROUND

Horticultural growing media are currently available in a variety of forms. Media may be produced from natural or synthetic materials. Some growing media are made from loose materials, such as peat and vermiculite. Other growth media are shaped, usually composed of phenolic foam, bonded foam, bonded peat, or wrapped peat, or a fibrous material, such as rock wool. Shaped growing materials are stabilized and held together by incorporation of a synthetic adhesive.

Numerous disadvantages exist when using currently available media; rock wool products, although naturally derived, do not degrade, synthetic fiber or foam growing media consume petroleum in their manufacture and likewise do not degrade, finally, the peat based media are bound together with synthetic polymers. Pollutants, waste, and chemicals can leach into the soil from a synthetic-based medium. Synthetic growing medium is generally not biodegradable and contributes to solid waste at landfills.

However, due to high costs and difficulty in production, there has been little commercial success in natural growth media products. Biodegradability, compostability and biocompatibility are desirable features of a natural growth medium. In addition to these characteristics, a growth medium would ideally be tailored to and produced for specific plant species; size, shape, density, moisture and fluid management characteristics are among these variables.

SUMMARY

One aspect of the invention relates to a method of producing a biodegradable growth medium for plants, comprising: providing a biopolymer, melt processing the biopolymer into fibers, and dispensing the fibers into a shaped cavity mold or cutting the resultant fibrous matrix into a suitably sized structure. The dispensed fibers are in a melted or semi-melted state due to the fiber forming process. During the practice of the method, the biopolymer fibers fuse together at a plurality of contact points and take the shape of the cavity mold.

Another aspect of the invention relates to a method of producing a biodegradable, plant growth medium comprising: providing a biopolymer, meltblowing the biopolymer into fibers, dispensing the fibers into a container, and forming a non-woven fiber block. The melt processing process forms fibers that subsequently melt or semi-melt the fibers and the fibers fuse together at a plurality of contact points after the dispensing step.

In one embodiment, the container is a propagating tray on a solid or perforated moving flat belt. In another embodiment, the container is a starting plate between two solid or perforated vertical conveyor belts. The vertical conveyor belts move downward at a rate approximately equal to the growth rate of fiber medium on the starting plate.

An aspect of the invention relates to using polylactic acid (PLA) as a biopolymer. Yet another aspect relates to using the broad family of polymers known as polyhydroxyalkanoates as a raw material biopolymer. A blend of polylactic acid and polyhydroxyalkanoate may also used as the biopolymer. Additional suitable biopolymers include, for example, chitosan, alginate, and silk fibroin.

In one aspect of the invention, a surfactant is added to the biopolymer to increase fluid transport and wetability. Examples of surfactants include Pluronic® F88, glycerol, and lecithin although numerous wetting agents, surfactants or humectants may serve the purpose. The surfactant can be added as a melt-additive and be spun throughout the fiber or can be added topically to the exterior as a fiber finish.

In one aspect of the invention, a wetting agent is added to the biopolymer. Examples of wetting agents include, for example, Protowet D-75, Rexowet RW, and Sterox CD.

One aspect of the invention involves cutting the biopolymer fiber block into cubes, about 1 inch to about 10 inches on a side. In yet another aspect, the sides of the cubes are covered with a barrier, such as a thin film, perforated film, mesh, net or a nonwoven. This outer wrap is preferably a biopolymer based material.

One aspect of the invention includes inserting a hole, also known as dibbling, the growth medium either while the fibers are being formed and placed in position or in a separate operation following the formation of the fibrous structure. The growth medium is sliced in another embodiment. A seed or plantlet may be planted in the growth medium that has been dibbled or sliced.

Yet another aspect of the invention is to construct a PLA fiber-based nonwoven structure sometimes referred to as needle-punched felt or densified batting using fibers produced for textile applications, and then forming or cutting that structure into the desired size/shape for horticulture use. These nonwoven media can be small or quite large and can entail propagation locations for multiple plants within one unit. They can be delivered in large sheets or rolls if desired. The cross section of these fibers is generally round however tri-lobal and fibers with deep longitudinal grooves produced by Fiber Innovation Technologies, under the name 4DG offer unusually fast wicking and moisture holding properties. Selection of the fiber cross sections, sizes and finish levels changes the properties of the nonwoven structures.

Another aspect of the invention relates to a plant growth medium, comprising a biodegradable biopolymer, a surfactant, and a wetting agent. The biopolymer, in one embodiment, is polylactic acid. In another embodiment, the biopolymer is a polyhydroxyalkanoates. In yet another embodiment, the biopolymer is a blend of polylactic acid and one or more polyhydroxyalkanoates.

In some embodiments, the surfactant is Pluronic® F88, glycerol, or lecithin. In other embodiments, the wetting agent is Protowet D-75, Rexowet RW, or Sterox CD.

DETAILED DESCRIPTION

Figure 1:
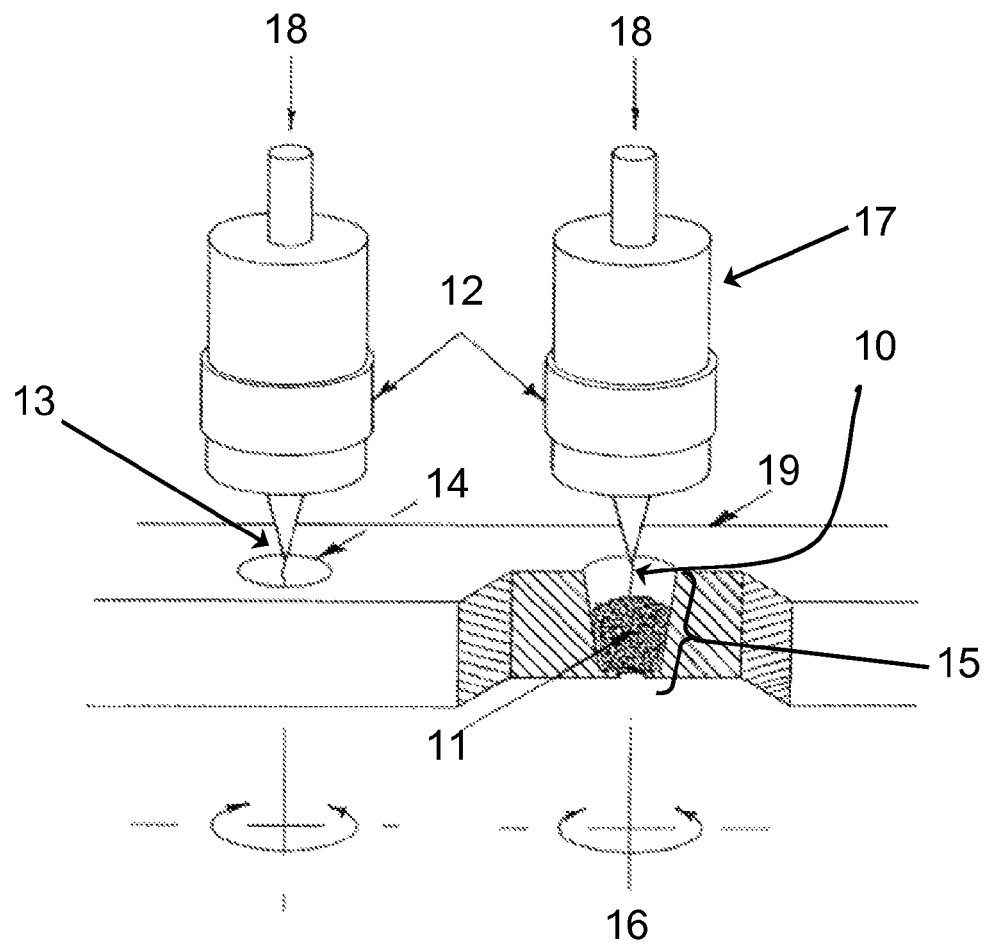
FIG. 1 depicts one embodiment of a method of the invention.

One aspect of the invention is a growth medium composition that may be used for growing plant seeds and cuttings. In one embodiment of the invention, the growth medium comprises or consists essentially of a biopolymer. In another embodiment of the invention, the biopolymer growth medium comprises or consists essentially of polylactic acid (PLA). In another embodiment, the biopolymer growth medium comprises or consists essentially of polyhydroxyalkanoates (PHA). In yet another embodiment, the biopolymer growth medium comprises or consists essentially of a copolymer of PLA and PHA. In another embodiment, additional materials are added to the biopolymer. In one embodiment, an additional material includes a surfactant. In another embodiment, an additional material includes a wetting agent. In one embodiment, the biopolymer growth medium is shaped. In another embodiment, a shaped biopolymer is covered with a barrier.

Another aspect of this invention is a method of producing a biopolymer growth medium. In certain embodiments, the method of producing a biopolymer growth medium affects the physical properties of the growth medium including, but not limited to, density, fiber diameter, fiber length, water-holding capacity, and porosity. In one embodiment, the biopolymer fiber diameter is controlled. In another embodiment of the invention, the density of the biopolymer is controlled.

The methods and compositions of the present invention permit the formation and preparation of a structurally homogeneous and mechanically strong biopolymer growth medium with defined dimensions. In certain embodiments, the biopolymer growth medium is dibbled to allow for the placement and germination of seeds in the medium.

DEFINITIONS

As used herein, the terms "cross-link" or "cross-linking" refers to an attachment of two chains of polymer molecules by bridges, composed of either an element, a group, or a compound, that join certain atoms of the chains by primary chemical bonds. For example, PHAs are linear polyesters that can cross-link to form stable three-dimensional structures by melt spinning (blowing). Cross-linking can be effected artificially, such as by adding a chemical substance (i.e., a cross-linking agent) and exposing the mixture to heat, or by subjecting the polymer to high-energy radiation.

As used herein, the terms "fiber" and "filament" are used interchangeably and refer to a slender, elongated, threadlike object or structure with a length:diameter (L/D) ratio of greater than 10:1.

As used herein, the terms "melt" and "semi-melt" are used interchangeably and refer to a liquid phase produced via a phase change from solid to liquid.

As used herein, the terms "bonded" and "bonding" refer to the joining, adhering, connecting, attaching, or the like, of two elements. Two elements will be considered to be bonded together when they are bonded directly to one another or indirectly to one another, such as when each is directly bonded to intermediate elements.

As used herein, the term "meltblown fibers" refers to fibers formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter, which may be to microfiber diameters (less than about 10 microns). Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin et al., which is incorporated by reference. Meltblown fibers are microfibers which may be continuous or discontinuous, are generally smaller than about 1.0 denier (1 denier=1 gram per 9000 meters; a 1 denier fiber has a diameter of about 10 micrometers), and self-bonding when deposited onto a collecting surface. Meltblown fibers used in the present invention are often substantially continuous in length.

Melt processes can be used to make fibers of various dimensions, including macrofibers (with average diameters from about 40 to about 100 microns), textile-type fibers (with average diameters between about 10 and 40 microns), and microfibers (with average diameters less than about 10 microns). Meltblowing processes are particularly suited to making microfibers, including ultra-fine microfibers (with an average diameter of about 3 microns or less). A description of an exemplary process of making ultra-fine microfibers may be found in, for example, U.S. Pat. No. 5,213,881 to Timmons et al., which is incorporated by reference.

As used herein, the term "nonwoven" in reference to a material, web or fabric refers to such a material, web or fabric having a structure of individual fibers or threads that are interlaid, but not in a regular or identifiable manner as in a knitted fabric. Nonwoven materials, fabrics or webs have been formed from many processes, such as meltblowing processes, spunbonding processes, air laying processes, and bonded carded web processes. The basis weight of nonwovens is usually expressed in ounces of material per square yard (osy) or grams per square meter (gsm) and the fiber diameters are usually expressed in microns. To an approximation, one may convert from osy to gsm by multiplying osy by 33.91.)

As used herein, the term "biodegradable" is defined as meaning when the matter is exposed to an aerobic and/or anaerobic environment, the ultimate fate is reduction to monomeric components due to microbial, hydrolytic, and/or chemical actions. Under aerobic conditions, biodegradation leads to the transformation of the material into end products, such as carbon dioxide and water. Under anaerobic conditions, biodegradation leads to the transformation of the materials into carbon dioxide, water, and methane. The biodegradability process is often described as mineralization. Biodegradability means that all organic constituents of the fibers are eventually subject to partial or complete decomposition through biological activity.

As used herein, the term "environmentally degradable" is defined as being biodegradable, disintegratable, "aqueous-responsive," dispersible, flushable, or compostable or a combination thereof.

The term "flushable" as used herein refers to materials which are capable of dissolving, dispersing, disintegrating, and/or decomposing in a septic disposal system, such as a toilet, to provide clearance when flushed down the toilet without clogging the toilet or any other sewage drainage pipe.

The term "aqueous-responsive" as used herein means that when placed in water or flushed, an observable and measurable change results. Typical observable changes include noting that the article swells, pulls apart, dissolves, or observing a general weakened structure.

A "highly attenuated fiber" is defined as a fiber having a high draw-down ratio. The total fiber draw-down ratio is defined as the ratio of the fiber at its maximum diameter (which typically results immediately after exiting the capillary) to the final fiber diameter in its end use.

Materials and Properties

One aspect of the present invention relates to a plant growth medium composition. In one embodiment, the growth medium comprises or consists essentially of a biopolymer. In another embodiment, the growth medium comprises or consists essentially of polylactic acid (PLA). In another embodiment, the growth medium comprises or consists essentially of polyhydroxyalkanoate (PHA). In yet another embodiment, the growth medium comprises or consists essentially of a mixture of PLA and PHA. Other embodiments of the invention add other materials to the biopolymer that enhance, improve, or cause additional benefit to the properties of the biopolymer growth medium. This additional material can be incorporated within the polymer melt or can be externally bonded to, or entrapped within, the individual fibers, web, fibers or block of fibers.

The biopolymer fibers used in the media of the present invention are environmentally degradable. As a result, the fibers can be easily and safely disposed of either in existing composting facilities or may be flushable; i.e., they can be safely flushed down the drain without detrimental consequences to existing sewage infrastructure systems. The environmental degradability of the fibers of the present inventions offer a solution to the problem of accumulation of such materials in the environment. The degradability of the fibers of the present invention offers additional convenience to the consumer.

The PHA copolymer constituent of the present blends will readily degrade by microbial or enzymatic activity, thereby forming a porous structure which is more accessible to and which facilitates hydrolytic processing of the PLA constituent followed by biodegradation of PLA hydrolytic products.

A variety of different standardized biodegradability methods have been established by various organizations and in different countries. Although the tests vary in the specific testing conditions, assessment methods, and criteria desired, there is reasonable convergence between different protocols so that they are likely to lead to similar conclusions for most materials. For aerobic biodegradability, the American Society for Testing and Materials (ASTM) has established ASTM D 5338-92: Test Methods for Determining Aerobic Biodegradation of Plastic Materials Under Controlled Composting Conditions. The test measures the percent of test material that mineralizes as a function of time by monitoring the amount of carbon dioxide being released as a result of assimilation by microorganisms in the presence of active compost held at a temperature of 58° C. Carbon dioxide production testing may be conducted via electrolytic respirometry. Other standard protocols, such 301B from the Organization for Economic Cooperation and Development (OECD), may also be used. Standard biodegradation tests in the absence of oxygen are described in various protocols such as ASTM D 5511-94. These tests are used to simulate the biodegradability of materials in an anaerobic solid-waste treatment facility or sanitary landfill.

The fibers of the present invention may also disintegrate. Disintegration occurs when the fibrous substrate has the ability to fragment rapidly and break down into fractions small enough not to be distinguishable after screening when composted or to cause drainpipe clogging when flushed. A disintegratable material may also be flushable. Most protocols for disintegratability measure the weight loss of test materials over time when exposed to various matrices. Both aerobic and anaerobic disintegration tests are used. Weight loss is determined by the amount of fibrous test material that is no longer collected on an 18 mesh sieve with 1 millimeter openings after the materials is exposed to wastewater and sludge. For disintegration, the difference in the weight of the initial sample and the dried weight of the sample recovered on a screen will determine the rate and extent of disintegration.

In certain embodiments, the fibers of the present invention are compostable. ASTM has developed test methods and specifications for compostability. The test measures three characteristics: biodegradability, disintegration, and lack of ecotoxicity. Tests to measure biodegradability and disintegration are described above. To meet the biodegradability criteria for compostability, the material must achieve at least about 60% conversion to carbon dioxide within 40 days. For the disintegration criteria, the material must have less than 10% of the test material remain on a 2 millimeter screen in the actual shape and thickness that it would have in the disposed product. To determine the last criteria, lack of ecotoxicity, the biodegradation byproducts must not exhibit a negative impact on seed germination and plant growth. One test for this criteria is detailed in OECD 208. The International Biodegradable Products Institute will issue a logo for compostability once a product is verified to meet ASTM 6400-99 specifications. The protocol follows Germany's DIN 54900 which determine the maximum thickness of any material that allows complete decomposition within one composting cycle.

The fibers described herein may be used to make disposable nonwoven growth media that are flushable. The fibers and resulting articles may also be aqueous-responsive.

The fibers of the present invention may be thermally bondable. Thermally bondable fibers are required for the pressurized heat and thru-air heat bonding methods. PHA blended with PLA can improve the bonding characteristics of the fibers over PLA alone for highly oriented PLA fibers.

The fibers of the present invention may be highly attenuated and may have a diameter from about 1 to about 1000 micrometers. In certain embodiments, the fiber diameter is about 50 to about 500 micrometers. In certain embodiments, the fiber diameter is about 75 to about 200 micrometers. In certain embodiments, the fiber diameter is about 90 to about 125 micrometers. Fibers commonly used to make nonwoven material may have a diameter from about 50 micrometers to about 150 micrometers. Fiber diameter may be controlled by extruder orifice size, spinning speed (or total draw-down ratio), mass throughput, and blend composition, or combinations thereof.

Additional Materials

Additional ingredients may be incorporated into the compositions in quantities of less than about 50%, or from about 0.1% to about 20%, or from about 0.1% to about 12% by weight. The optional materials may be used to modify the processability and/or to modify physical properties, such as water retention, elasticity, tensile strength and modulus of the final product. Other benefits include, but are not limited to, stability including oxidative stability, brightness, color, flexibility, resiliency, workability, processing aids, viscosity modifiers, and odor control.

Nonlimiting examples of other optional ingredients include surfactants, wicking agents, wetting agents, and rewetting agents. Examples of typical surfactants include, but are not limited to, Pluronics, such as Pluronic® F88, or an adjuvant, such as glycerol or lecithin. Surfactants enhance the wicking or water-holding properties of the polymer.

Pluronics, also known as poloxamers, are polyoxyethylene-polyoxypropylene-polyoxyethylene block copolymers which are nonionic surfactants. Their surfactant properties have been useful in detergency, dispersion, stabilization, foaming, and emulsification. The average molecular weights of commercially available poloxamers range from about 1,000 to greater than 16,000 Daltons. Because the poloxamers are products of a sequential series of reactions, the molecular weights of the individual poloxamer molecules form a statistical distribution about the average molecular weight. In addition, commercially available poloxamers (such as those from BASF, Ludwigshafen, Germany) may contain substantial amounts of poly(oxyethylene) homopolymer and poly(oxyethylene)/poly(oxypropylene) diblock polymers. The relative amounts of these byproducts increase as the molecular weights of the component blocks of the poloxamer increase. Depending upon the manufacturer, these byproducts may constitute from about 15% to about 50% of the total mass of the commercial polymer. As used herein, "Pluronic® 88" refers to a polyoxyethylene-polyoxypropylene-polyoxyethylene ($EO_m$—$PO_n$-$EO_m$) block copolymer having an average molecular weight of about 11,400 Daltons and a ratio of m/n of about 97/39.

Examples of a wetting or rewetting agent include, but are not limited to, dialkyl sulfosuccinates (e.g., Protowet D-75), anionic sulfonated aliphatic esters (e.g., Rexowet RW), or polyoxyethylene esters (e.g., Sterox CD). Protowet D-75 is dioctyl sulfosuccinate. Rexowet RW is an anionic sulfonated aliphatic mono and diester. Sterox CD is a polyoxyethylene ester.

Nonlimiting examples of other optional ingredients also include aromatic/aliphatic polyester copolymers made more readily hydrolytically cleavable, and hence more likely biodegradable, such as those described in U.S. Pat. Nos. 5,053,482, 5,097,004, 5,097,005, and 5,295,985 (all of which are incorporated by reference), biodegradable aliphatic polyesteramide polymers, polycaprolactones, polyesters or polyurethanes derived from aliphatic polyols (i.e., dialkanoyl polymers), polyamides including polyethylene/vinyl alcohol copolymers, cellulose esters or plasticized derivatives thereof, salts, slip agents, crystallization accelerators, such as nucleating agents, crystallization retarders, odor masking agents, cross-linking agents, emulsifiers, surfactants, cyclodextrins, lubricants, other processing aids, optical brighteners, antioxidants, flame retardants, dyes, pigments, fillers, proteins and their alkali salts, waxes, tackifying resins, extenders, antiblocking agents, antistatic agents, or mixtures thereof. Inorganic and organic fillers, such as clay, dirt, or various minerals, are particularly useful as fillers. Slip agents may be used to help reduce the tackiness or coefficient of friction of a fiber. Also, slip agents may be used to improve fiber stability, particularly in high humidity or temperatures. Exemplary slip agents comprise polyethylene or polyamide. A salt may also be added to the melt to make the fiber more water responsive or used as a processing aid. A salt will often function to help reduce the solubility of a binder so it does not dissolve, but when put in water or flushed, the salt will dissolve enabling the binder to dissolve and create a more aqueous-responsive product.

Processes and Method of the Invention

Generally, the first step in producing a fiber is the compounding or mixing step in which the raw materials are heated, typically under shear. Shearing in the presence of heat will result in a homogeneous melt. The melt is then delivered under pressure to an extrusion die or spinneret where fibers are formed. A collection of fibers is combined together using heat, pressure, chemical binder, mechanical entanglement, or combinations thereof resulting in the formation of a nonwoven web. The nonwoven web is then processed into a growth medium.

A suitable mixing device is a multiple mixing zone twin screw extruder. A twin screw batch mixer or a single screw extrusion system can also be used. As long as sufficient mixing and heating occurs, the particular equipment used is not critical. Further, a side extruder or injector off of the main extruder may be used to inject a low-volume additive polymer melt in the main extruder or to the die. This approach is a convenient way to introduce pigments, processing aides, surfactants, or other compounds or compositions with desired properties.

An alternative method for compounding the materials involves adding the polymers to an extrusion system where they are mixed at progressively increasing temperatures. For example, in a twin screw extruder with six heating zones, the first three zones may be heated to 90°, 120°, and 130° C., respectively, and the last three zones may be heated above the melting point of the polymer.

In certain embodiments, the present invention utilizes the process of melt spinning. In melt spinning, there is little or no mass loss in the extrudate. Melt spinning is differentiated from other types of spinning, such as wet or dry spinning from solution, where a solvent is being eliminated by volatilizing or diffusing out of the extrudate resulting in a mass loss.

Spinning may occur at temperatures of about 100° C. to about 270° C., about 120° C. to about 230° C., or about 170° C. to about 210° C. The processing temperature is determined by the chemical nature, molecular weights and concentration of each component.

Fiber spinning speeds of greater than 100 meters/minute may be required. The fiber spinning speed may be from about 500 to about 10,000 meters/minute, from about 2,000 to about 7,000 meters/minute, or from about 2,500 to about 5,000 meters/minute. Continuous fibers can be produced through spunbond methods or meltblowing processes, or non-continuous (staple) fibers can be produced. The various methods of fiber manufacturing can also be combined to produce a combination technique.

The homogeneous blend can be melt spun into fibers on conventional melt spinning equipment. The fibers spun can be collected using conventional godet winding systems or through air drag attenuation devices. If the godet system is used, the fibers can be further oriented through post extrusion drawing at temperatures from about 50 to about 140° C. The drawn fibers may then be crimped and/or cut to form non-continuous fibers (staple fibers).

After the fiber is formed, the fiber may further be treated or the bonded fabric can be treated. A hydrophilic, hydrophobic, or surfactant finish can be added to adjust the surface energy and chemical nature of the fibers or fabric. For example, fibers that are hydrophobic may be treated with wetting agents to facilitate absorption of aqueous liquids. A bonded fabric can also be treated with a topical solution containing surfactants, pigments, slip agents, salt, or other materials to further adjust the surface properties of the fiber.

More specifically, the present invention is directed to methods of producing a biopolymer growth medium. One embodiment of this method is depicted in FIG. 1. A source of biopolymer fibers comes from extruder 18, flows through dispense nozzle 17 with nozzle band heater 12, and out the extruder nozzle 13. The extruder nozzle 13 has 1 or more orifices from which the melted fibers 10 flow out of. In this embodiment, the melted or semi-melted biopolymer fibers 10 flow directly into a shaped cavity 14 forming a fiber melt 11.

A plurality of shaped cavities 14 depicted in FIG. 1 are each filled simultaneously with biopolymer fibers extruded from a plurality of dispense nozzles 17. The shaped cavities 14 are molded in a propagating tray 19. The shaped cavity 14 in FIG. 1 is substantially cylindrical in shape and has an open top end and a bottom end. The top end and bottom end are substantially circular in shape, wherein the top end has a larger diameter than the bottom end. The sides 15 of the cavity 14 are tapered. It is within the scope of this invention that cavity 14 can be of many different shapes and sizes particularly suited for plant seed growth and germination.

The above described system could be scaled to mass produce and fill a plurality of cavities 14 simultaneously. The cavities, in certain embodiments, could be those of a conventional propagating tray 19. In other embodiments, they are a hard tooled mold with the molded fiber parts which are then transferred to a conventional propagating tray.

Figure 2:
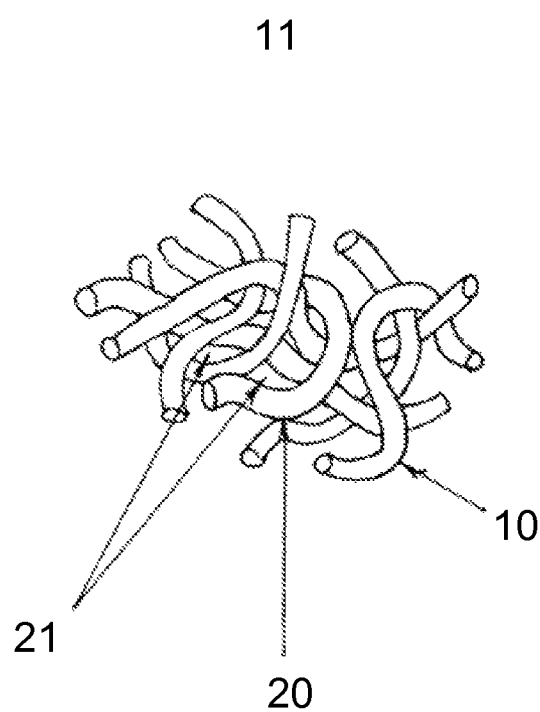
FIG. 2 is a magnified view of certain biopolymer fibers of the invention.

The melted or semi-melted biopolymer fibers 10 reach the bottom of shaped cavity 14 and pile on itself, taking the shape of cavity 14. The melted or semi-melted fibers 10 fuse at a plurality of contact points 20, shown in greater detail in FIG. 2. As the biopolymer fiber melt 11 cools, the contact points 20 solidify forming a rigid and mechanically strong structure. The contact points 20 create spaces 21 between the biopolymer fibers 10 for water, air, and plant roots. The size of the spaces 21 is directly related to the frequency of the contact points 20. In other words, the air spaces 21 determine the overall density of the biopolymer fiber melt. The higher the density, the greater the number of contact points 20 and smaller the size of spaces 21 within the fiber melt 11. Hence, more space is occupied by biopolymer fibers 10. The lower the density, the fewer the number of contact points 20 and the larger the number and size of the air spaces 21. Less space is occupied by biopolymer fibers 10.

The number of contact points 20 within a fiber melt 11 is controlled by oscillation of the extruder nozzle 17 or the propagating tray mold 19 around an axis 16 as depicted in FIG. 1. The oscillation of either the extruder nozzle 17 or the propagating tray mold 19 directly effects the density of the biopolymer fiber melt 11.

The temperature, flow and pressure of both the polymer melt and any air used in fiber attenuation can be varied. Manipulation of these three variables directly impact the resultant fibers. Fiber diameter, drawing ration or polymer orientation, porosity to air or fluids and other physical and chemical properties are variable. This allows the manufacture of multi-layered structures, all on an automated basis. If a side extruder or injector is utilized, the additives introduced via this system can also be manipulated and varied.

It is possible to utilize multiple extrusion systems with the same or different melt polymers and construct a web or substrate containing multiple layers. Following this concept, selective manipulation of the polymer flow from multiple extrusion systems can create a tailored finished product with differing layers, fiber types, fiber properties, thickness or density. The range of possibilities is broad. Computerized process control can be utilized to control all these variables at a very high rate of speed for optimized productions speeds.

It is within the scope of this invention to produce biopolymer growth medium with a range of densities, dependant upon the physical oscillation frequency 16 of the extruder nozzle 17 or the propagating tray mold 19. It is also within the scope of this invention to produce a biopolymer growth medium with a specific density to provide the optimal growing environment for a particular plant. Some plants require little water and would be most suited for a higher density growth medium. Other plants require greater amounts of water and nutrients and would be most suited for a lower density growth medium.

Figure 3:
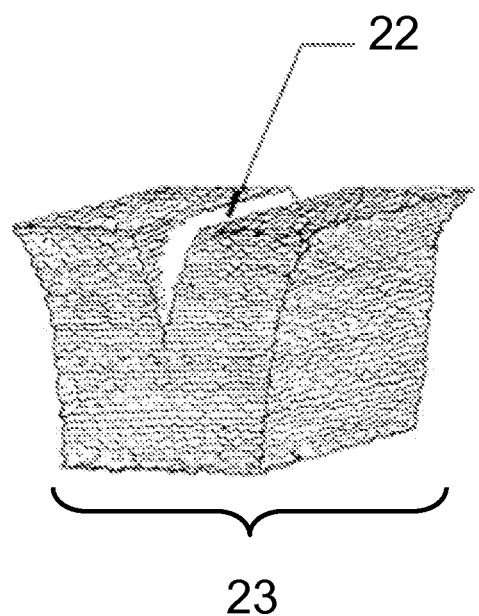
FIG. 3 depicts a cube of a molded biopolymer growth medium with a partial slice.

The physical properties of the biopolymer growth medium including density, porosity, water holding capacity, and physical integrity are controlled. A final step, in the embodiment shown in FIG. 5, includes a biopolymer growth medium 23 dibbled with a tapered pin to separate the filaments forming a cavity 31. A seed, cutting, or plantlet is planted in cavity 31. In another embodiment, a heated pin is used to create a more defined dibble cavity 31. In other embodiments, a hole is formed completely through the medium from top to bottom by incorporating a pin in the shaped cavity 14 and forming the fibers 10 around it. In another embodiment, as shown in FIG. 3, a partial slice 22 through the fibers allows the formed medium 23 to be opened up to receive a larger plantlet. In another embodiment, a web of fibers can be wound in a cylinder of any diameter with or without a hole in the center.

Figure 4:
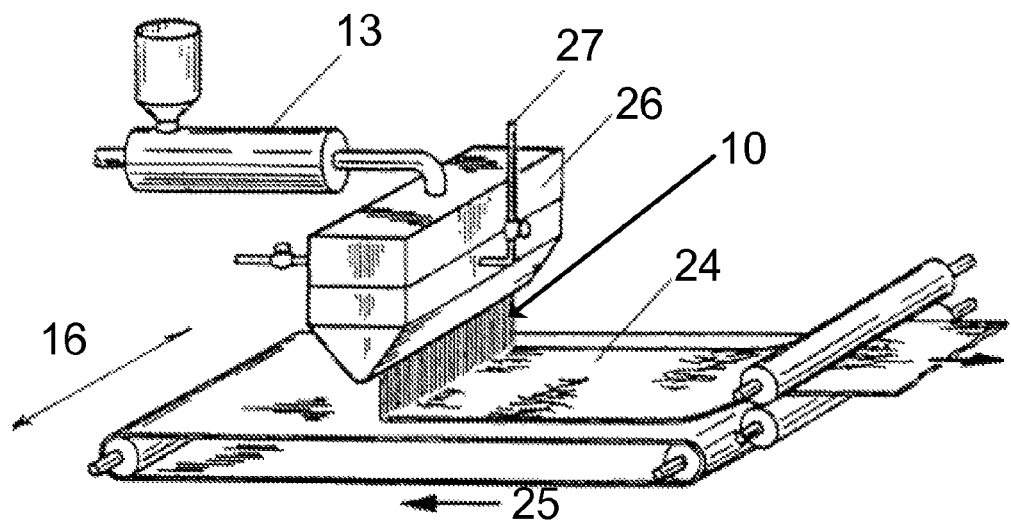
FIG. 4 depicts another embodiment of a method of the invention.

FIG. 4 shows another embodiment of the method of the invention. A slab, mat, or free standing block of biopolymer growing medium 24 is produced in a propagating tray. In this embodiment, the biopolymer fibers 10 are laid down onto a moving flat belt 25. The melt blow head nozzles 26 or the flat belt 25 may be oscillated 16 from side to side to impart lateral overlay of the fibers 10 as they are laid down. Any semi-melted or melted biopolymer fibers 10 that contact other fibers will bond and fuse as the fibers cool. The resultant nonwoven biopolymer medium 24 may be in a continuous loop under the melt blow head 26 until the desired thickness is reached with each successive layer bonding to the one below it. In other embodiments, a plurality of melt blow head nozzles 26 are used to build growing medium 24 thickness. The density of the growing medium 24 is controlled by varying the temperature of the biopolymer melt and the oscillation 16 of the flat belt 25.

Figure 5:
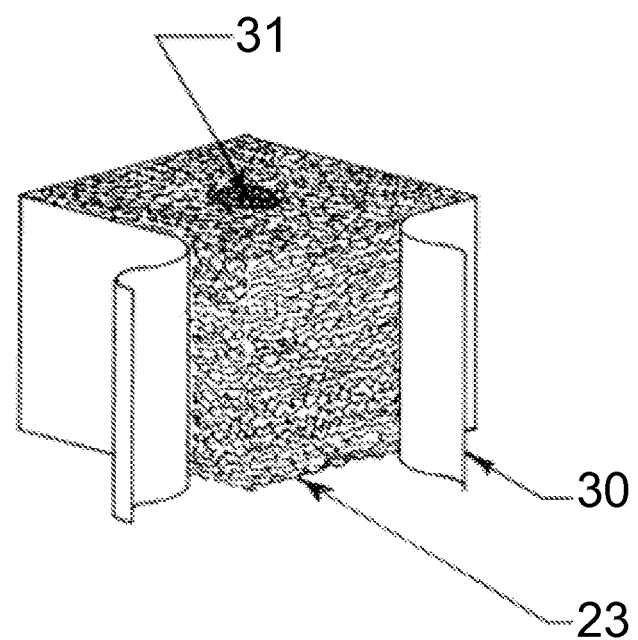
FIG. 5 is a top and side view of an embodiment of a growth medium of the invention.

The biopolymer growth medium 24 is cut to shape into a cube 23 in the embodiment shown in FIG. 5. In one embodiment, the diameter of the cube is between 1 and 10 inches. In another embodiment, the diameter of the cube is between 2 and 5 inches. In yet another embodiment, the diameter of the cube is between 3 and 4 inches. Four sides of the cube are covered with a barrier 30, such as a film, to inhibit moisture and nutrient loss and provide a printable surface for branding. The die cut shape 23 is dibbled with an appropriate pin to create a cavity 31 into which a seed, cutting, or plantlet is planted. The above described slab or mat may also be produced by needle punching or hydroentangling the fibers to achieve a mechanical bond between them.

The embodiments of the methods depicted in FIGS. 1 and 4 show biopolymer fibers 10 either filling a shaped cavity 14 or a flat belt 25. The fibers generally run in a side to side pattern, such that each fiber is substantially in a plane parallel to the surface of the ground (horizontal grain). In the embodiment of the method depicted in FIG. 6, the grain of the biopolymer fibers 10 in the fiber melt 11 also run horizontally. However, a growth medium with a horizontal grain may hinder root development in some plants. For example, loblolly pines prefer a straight vertical path for root growth.

Figure 6:
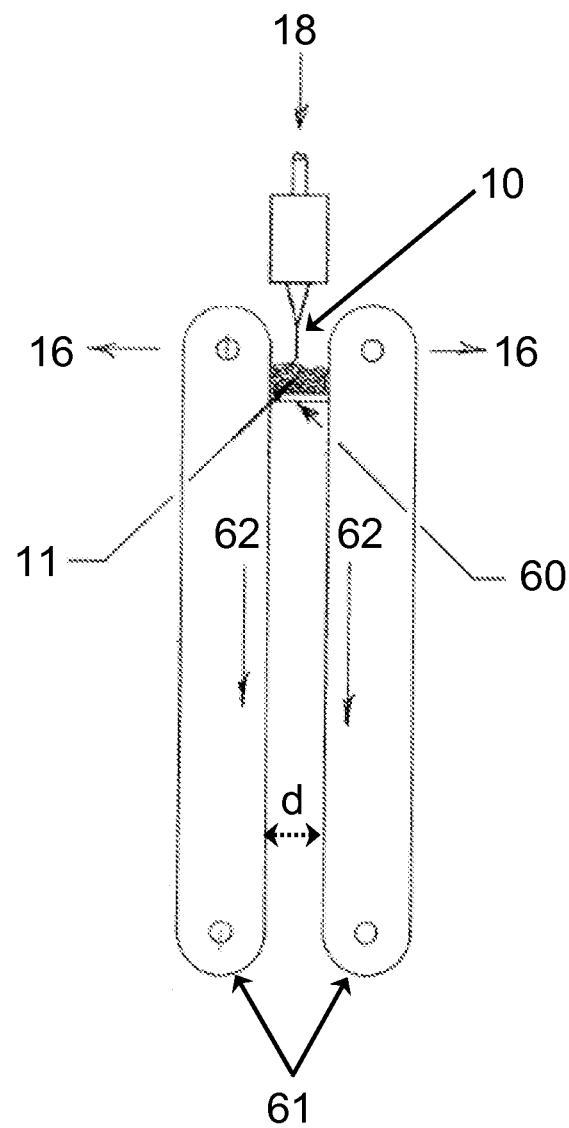
FIG. 6 depicts an embodiment of a method of the invention.
Figure 7:
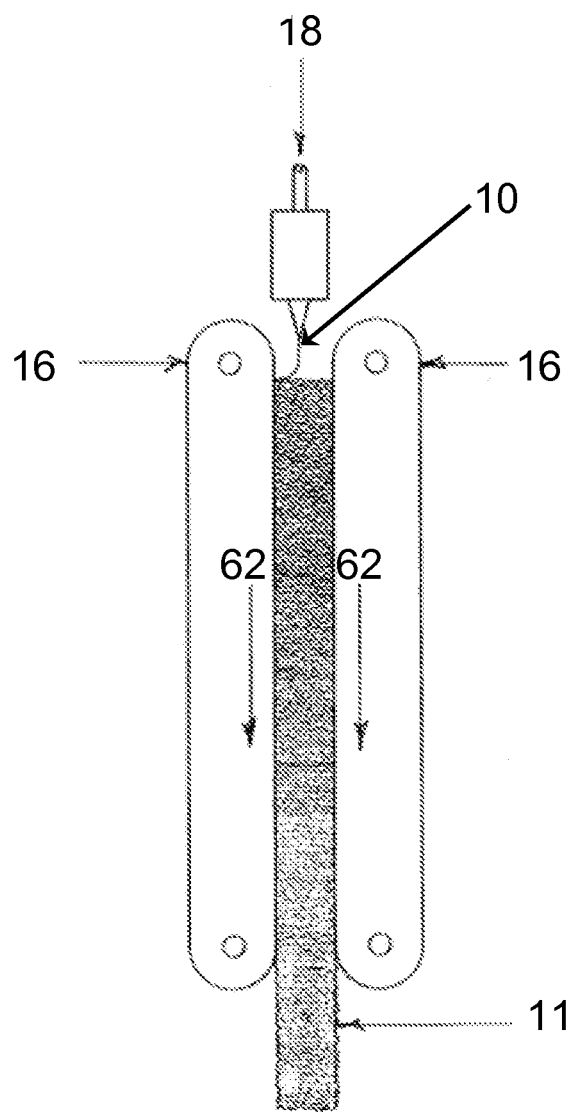
FIG. 7 depicts an embodiment of a method of the invention and the nonwoven fiber melt.

A method of producing a biopolymer growth medium with fibers in a vertical grain is shown in the embodiment in FIGS. 6 and 7. Biopolymer fibers 10 are laid down between two vertical conveyor belts 61 to produce a biopolymer growth medium 11 with a horizontal grain. The initial fibers are laid down on a starting plate 60 fit between the two conveyor belts 61. The conveyor belts 61 oscillate 16 a total distance approximately equal to the distance d between the two belts

61. The distance d between the two belts 61 determines the vertical height of the slab 11. The conveyor belts 61 move downward 62 at a rate approximately equivalent to the growth rate of the fiber medium 11 seen in FIG. 7. The biopolymer fibers 10 are in a semi-melted state and bond to each other at contact points.

Another embodiment is to collect the fibers and form the web at the nip point of two rotating drums or screens. This is of value as the fibers can be collected and placed with the fibers oriented in all dimensions, X, Y and Z by adjusting the distance between the drums, the vacuum levels and drum diameter.

If the orientation of the two drums is horizontal, with the fibers being formed from above and drawn downward, this allows the placement of solid powder or granule feeder that can introduce an additive. This solid feeder can be physically placed close to the collection device or it can be remotely located with the solids being conveyed by an air stream. Superabsorbents, starch, peat moss, cellulose or other fibers, chemical additives or fertilizers can be added in this manner. The deliver speed of this solid system can be varied and turned on/off as desired allowing a complex structure to be formed. It is especially interesting if two spinneret's are positioned above the dual-drum collector and the solid additives are introduced between them forming a bonded sandwich of materials, a composite.

In the embodiment of the method in FIG. 7, the biopolymer medium 11 is cut to a specified length, laid flat (by rotating 90°), and then die cut to the desired shape. The die cut growth medium 11 will have fibers 10 that are substantially in a plane perpendicular to the ground. The growth medium 11 has a vertical grain with height d. In one embodiment, the shaped growth medium 11 is dibbled. In another embodiments, the sides of the growth medium 11 are covered with a barrier material 30. In another embodiment, the conveyor belts are lined with a barrier material 30, such as a poly film, so that the growth medium emerges from the conveyor belts 61 pre-covered. In this embodiment, holes would be punched in the film to facilitate planting from the top and water absorption and drainage from the bottom.

Additional Structures

Additional structures may be produced by modifying the extrusion process. Gasses such as nitrogen or carbon dioxide may be incorporated into the polymer melt. Introduction of the gas is done at a high pressure and at a point in the extrusion barrel that allows the gas to be mixed into the polymer by a mixer portion of the extruder screw before exiting the extruder die head. The end result is a foamed structure that can be formed as a sheet and then die cut or dispensed into molds to create shapes.

Other materials such as a mixture of sodium bicarbonate and citric acid may be added to the polymer to act as a chemical blowing agent, again to produce a foamed result. Chemical blowing agents are dry powders that when heated degrade to release gas, primarily carbon dioxide or nitrogen. This gas remains in solution in the polymer melt while the polymer melt is under pressure in the extruder or injection molding machine barrel. When the melt exits the die or nozzle, pressure is reduced and allows the gas to expand and foam the resulting product.

Additions of plasticizers, surfactants, wetting agents, as well as controlled melt temperatures can yield foam structures somewhat similar in performance characteristics to fiber formed materials. Small open cells in a reticulated format are not unlike random fibers and the air to solids ratio, capillary features, density and flexibility can be similar as well.

There can be certain advantages of foamed over fiber shaped products. Foamed shapes tend to have a smoother and more "finished" surface finish which makes machine handling and automation less problematic since the parts don't tend to stick or catch on each other. Other advantages are better structural integrity and more compatibility to molding processes.

Selected Aspects of the Invention

One aspect of the invention relates to a method for producing a biodegradable, plant growth medium comprising the steps of: providing a biopolymer; melt processing the biopolymer into fibers; and dispensing the fibers into a shaped cavity mold, thereby forming a growth medium; wherein the fibers are in a melted or semi-melted state after the melt processing step, the fibers fuse together at a plurality of contact points once dispensed, and the dispensed fibers conform to in the shape of the cavity mold.

In certain embodiments, the invention relates to any one of the aforementioned methods, wherein the biopolymer is selected from the group consisting of polylactic acid and polyhydroxyalkanoates.

In certain embodiments, the invention relates to any one of the aforementioned methods, further comprising the step of adding a surfactant to the biopolymer. In certain embodiments, the invention relates to any one of the aforementioned methods, wherein the surfactant is selected from the group consisting of ethylene oxide/propylene oxide block copolymers, glycerol, and lecithin.

In certain embodiments, the invention relates to any one of the aforementioned methods, further comprising the step of adding a wetting agent to the biopolymer. In certain embodiments, the invention relates to any one of the aforementioned methods, wherein the wetting agent is selected from the group consisting of dialkyl sulfosuccinates, anionic sulfonated aliphatic esters or polyoxyethylene esters.

In certain embodiments, the invention relates to any one of the aforementioned methods, further comprising the steps of forming a channel for seed placement and root growth or dibbling the growth medium; and planting a seed within the growth medium.

In certain embodiments, the invention relates to any one of the aforementioned methods, further comprising the steps of slicing the growth medium; and planting a plantlet within the growth medium.

Another aspect of the invention relates to a method for producing a biodegradable, plant growth medium comprising the steps of: providing a biopolymer; melt processing the biopolymer into fibers; and dispensing the fibers into a container, thereby forming a growth medium; wherein the fibers are in a melted or semi-melted state after the melt processing step; the fibers fuse together at a plurality of contact points once dispensed, and the dispensed fibers form a non-woven fiber sheet or block.

In certain embodiments, the invention relates to any one of the aforementioned methods, wherein the container is a propagating tray on a moving flat belt.

In certain embodiments, the invention relates to any one of the aforementioned methods, wherein the container is a starting plate between two vertical or circular conveyor belts; the non-woven fiber block is foamed on the starting plate; and the starting plate and the conveyor belts move downward at a rate approximately equal to the growth rate of fiber medium.

In certain embodiments, the invention relates to any one of the aforementioned methods, wherein the biopolymer is selected from the group consisting of polylactic acid and polyhydroxyalkanoates.

In certain embodiments, the invention relates to any one of the aforementioned methods, further comprising the step of adding a surfactant to the biopolymer. In certain embodiments, the invention relates to any one of the aforementioned methods, wherein the surfactant is selected from the group consisting of ethylene oxide/propylene oxide block copolymers, glycerol, and lecithin.

In certain embodiments, the invention relates to any one of the aforementioned methods, further comprising the step of cutting the biopolymer fiber block into cubes about 1 inch to about 10 inches in diameter.

In certain embodiments, the invention relates to any one of the aforementioned methods, further comprising the steps of dibbling the growth medium and planting a seed within the growth medium.

In certain embodiments, the invention relates to any one of the aforementioned methods, further comprising the steps of slicing the growth medium and planting a seed within the growth medium.

In certain embodiments, the invention relates to any one of the aforementioned methods, further comprising the step of covering four sides of the cube with a barrier film.

In certain embodiments, the invention relates to any one of the aforementioned methods, further comprising the step of adding a wetting agent to the biopolymer. In certain embodiments, the invention relates to any one of the aforementioned methods, wherein the wetting agent is selected from the group consisting of dialkyl sulfosuccinates, anionic sulfonated aliphatic esters or polyoxyethylene esters.

In certain embodiments, the invention relates to any one of the aforementioned methods, further comprising the step of introducing a gas during the melt processing. In certain embodiments, the invention relates to any one of the aforementioned methods, wherein the gas is nitrogen.

In certain embodiments, the invention relates to any one of the aforementioned methods, further comprising the step of adding a chemical blowing agent to the biopolymer before the melt processing. In certain embodiments, the invention relates to any one of the aforementioned methods, wherein the chemical blowing agent is a citric acid sodium bicarbonate type chemical blowing agent.

Another aspect of the invention relates to a growth medium prepared by any of the aforementioned methods.

Another aspect of the invention relates to a plant growth medium, comprising: a plurality of fibers, wherein said fibers comprise a biodegradable biopolymer and a surfactant; and a wetting agent; wherein the fibers are coated with the wetting agent.

Another aspect of the invention relates to a plant growth medium, comprising: a plurality of fibers, wherein said fibers comprise a biodegradable polymer, a surfactant and a wetting agent.

In certain embodiments, the invention relates to any one of the aforementioned growth mediums, wherein the biodegradable biopolymer is selected from the group consisting of polylactic acid and polyhydroxyalkanoates.

In certain embodiments, the invention relates to any one of the aforementioned growth mediums, wherein the surfactant is selected from the group consisting of ethylene oxide/propylene oxide block copolymers, glycerol, and lecithin.

In certain embodiments, the invention relates to any one of the aforementioned growth mediums, wherein the wetting agent is selected from the group consisting of dialkyl sulfosuccinates, anionic sulfonated aliphatic esters or polyoxyethylene esters.

In certain embodiments, the invention relates to any one of the aforementioned growth mediums, wherein the growth medium has an at least partially reticulated, open cell structure.

EXEMPLIFICATION

The invention now being generally described, it will be more readily understood by reference to the following example, which is included merely for purposes of illustration of certain aspects and embodiments of the present invention, and is not intended to limit the invention.

Example 1

Figure 8:
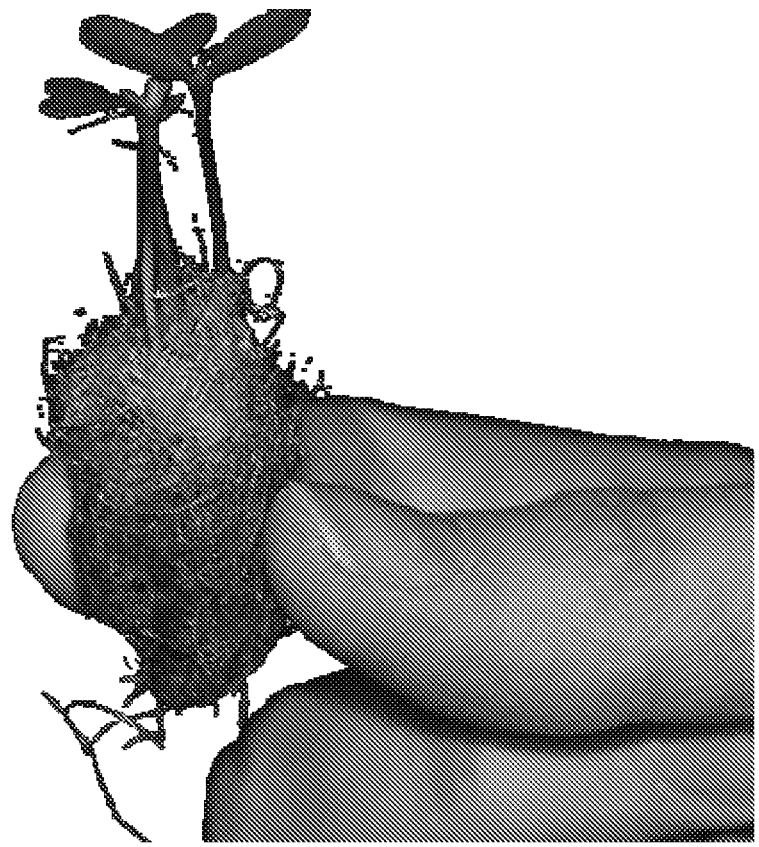
FIG. 8 is a photograph of a marigold seedling growing in a growth medium of the invention.
Figure 9:
FIG. 9 is a photograph of a marigold seedling growing in a growth medium of the invention.
Figure 10:
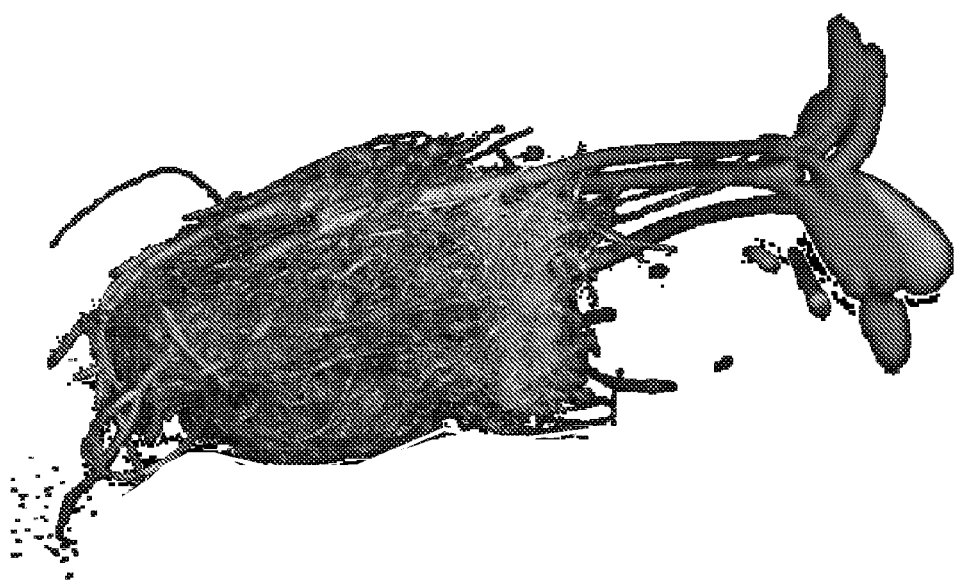
FIG. 10 is a photograph of a marigold seedling growing in a growth medium of the invention.

A melt of Cargill NatureWorks® PLA 6300D polymer was prepared. Incorporated into the melt were 9.7% Alcolec (American Lecithin Company) and 2.2% glycerin. Fibers were spun from the melt with an average diameter of 0.004 inches (101.6 µm). The fibers were then inserted into a number of cavities of a standard 200 cavity horticultural propagating tray in a random manner and compacted to an optimum density. After dibbling, Marigold seeds were planted in the growth medium, watered and allowed to germinate. After the young plants germinated, the rooted medium was removed for observation. Upon removal of the medium, it was observed that root formation and growth was adequate and that the plants were ready for transplanting. FIGS. 8-10 are photographs corresponding to this example.

Example 2

A 100 gram sample of Nature Works PLA 6300D was prepared by melting and heating to 240° C. To this, 5 grams of American Lecithin Co. Alcolec S was added and thoroughly mixed. The melt was then poured into a laboratory scale spinner resembling a saucer shaped vessel with vertical edges at its outer diameter. A number of orifices of 0.032 inch diameter penetrate this outer edge at regular intervals. When the device is rotated at high speed centrifugal force causes the melt to be extruded through the orifices. The resultant fibers are collected on an outer collar spaced at a sufficient distance from the spinner to allow the fibers to cool and solidify. Axial reciprocation of the spinner causes the fibers to be deposited in a repetitive overlay on the collector and each other. The end result is essentially a nonwoven mat of fibers. The mat was then measured for fiber caliper, fiber breaking strength, density, absorbency, and water wicking time.

TABLE 1

| | | |
|---|---|---|
| Fiber caliper | 0.076 | mm |
| Fiber breaking strength | 38.7 | g |
| Mat sample volume | 0.795 | cc |
| Mat density | 0.226 | g/cc |
| Sample weight dry | 0.18 | g |
| Sample weight wet | 0.74 | g |
| Water uptake | 0.56 | g |
| Time to total saturation | 6.38 | seconds |
| Water absorption | 0.704 | g/cc |

Example 3

Example 2 was repeated with the exception that a 1 inch 5-7 lb/hour pilot line extruder with a miltistrand extrusion die was used in place of the laboratory spinner. To facilitate this, 2 kg of Nature Works PLA 6300D were melted and heated to 240° C. 100 grams of Alcolec S were added and thoroughly mixed. The resultant melt was poured onto a "cookie sheet" and allowed to harden with an approximate thickness of ⅛ inch. The hardened melt was then cut up into pellet sized pieces of about ⅛×¼×¼ inch. This created essentially a "master batch" for in feed into the pilot extruder. The extruder run conditions were set at approximately 4 lbs/hour, in feed temperature at 150° C., mid barrel temperature at 220° C., downstream barrel end at 240° C., and the extrusion die at 240° C. Fibers were produced both with free exit from the extrusion die and with 200° C. heated air assist. The fiber caliper ranged from 0.0073 inches with the free exit and 0.0015 inches with the air assist. The fibers were bundled and manually laid to simulate a non woven mat. The mat was then measured for fiber caliper, fiber breaking strength, density, absorbency, and water wicking time. It was noted the tensile strength and absorbency of the product from the extruder was less than that from the laboratory spinner. It was determined that thermal degradation accounted for the shift.

TABLE 2

| Fiber caliper | 0.038 | mm |
|---|---|---|
| Fiber breaking strength | 14.2 | g |
| Mat sample volume | 0.825 | cc |
| Mat density | 0.298 | g/cc |
| Sample weight dry | 0.23 | g |
| Sample weight wet | 0.64 | g |
| Water uptake | 0.41 | g |
| Time to total saturation | 13.76 | seconds |
| Water absorption | 0.495 | g/cc |

Example 4

A melt of NatureWorks PLA Polymer 6202D was prepared as described in the fiber melt spinning technical data sheet. Table 3 provides the typical material and application properties.

TABLE 3

| | PLA Polymer 6202D |
|---|---|
| Physical Properties | |
| Specific Gravity | 1.24 |
| Relative Viscosity | 3.1 |
| % d (wt %) | 2.0 |
| Melt Index, g/10 min (210° C.) | 15-30 |
| Crystalline Melt Temperature (° C.) | 55-60 |
| Typical Fiber Properties | |
| Denier per filament | 0.5 dpf and higher |
| Tenacity (g/d) | 2.5-5.0 |
| Elongation (%) | 10-70 |
| Modulus (g/d) | 30-40 |
| Hot Air Shrinkage (%) (130° C., 10 min) | Less than 8% |

General-purpose screws with L/D ratios of 24:1 to 30:1 and 3:1 compression ratios are recommended. Screws with mixing sections or shallow metering channels may overheat the melt at high screw speeds. Typical melt spinning temperatures are 220-240° C. NatureWorks® PLA 6202D requires either high filament velocity or drawing and controlled heat setting to control shrinkage.

In-line drying capabilities are essential to process 6202D, which is supplied with a moisture content of less than 0.040% (400 ppm). The recommended moisture content to prevent viscosity degradation and potential loss of properties is less than 0.005% (50 ppm). Typical drying conditions are 4 hours at 80° C. (176° F.) with an airflow rate of greater than 0.5 cfm/lbs per hour of resin throughput. To prevent moisture regain, the resin should not be exposed to atmospheric conditions after drying. Applications for 6202D include, but is not limited to, fiberfill, non-wovens, agricultural woven and non-woven fabrics, and articles for household disposal.

Specific settings included a 2" 24:1 extruder with electric barrel heat followed by a gear web with high production rates. This web of fibers is collected on a drum and useful for various applications. Basic machine settings are provided in Table 4.

TABLE 4

| Spinnerette Details | | |
|---|---|---|
| width | in | 15.5 |
| rows of holes | no | 4 |
| ID of nozzle | in | 0.009 |
| OD of nozzle | in | 0.020 |
| distance nozzle to nozzle | in | 0.100 |
| number of nozzles or filaments | no | 620 |

| | | Roll 1 | Roll 2 | Roll 3 | Roll 4 & 5 | Roll 6 |
|---|---|---|---|---|---|---|
| extruder barrel zone 1 | F. | 430 | 430 | 430 | 430 | 430 |
| extruder barrel zone 2 | F. | 470 | 470 | 470 | 470 | 470 |
| extruder barrel zone 3 | F. | 490 | 490 | 490 | 490 | 490 |
| adapter plate | F. | 480 | 480 | 480 | 480 | 480 |
| transfer line | F. | 450 | 450 | 450 | 450 | 450 |
| die block 1 | F. | 485 | 485 | 485 | 485 | 485 |
| die block 2 | F. | 485 | 485 | 485 | 485 | 485 |
| polymer melt temp | F. | 472 | 472 | 472 | 472 | 472 |
| air temp setpoint | F. | 510 | 510 | 510 | 510 | 510 |
| air temp actual | F. | 510 | 510 | 510 | 510 | 510 |
| extruder speed | rpm | 12.4 | 12.4 | 12.4 | 12.4 | 12.4 |
| extruder pressure | psi | 1200 | 1200 | 1200 | 1200 | 1200 |
| die melt pressure | psi | 1000 | 1000 | 1000 | 1000 | 1000 |
| die air pressure | psi | 23 | 23 | 20 | 20 | 3 |
| die to collector distance | in | 12.5 | 12.5 | 12.5 | 12.5 | 12.5 |
| collector speed | fpm | 50 | 50 | 50 | 50 | 50 |
| basis weight | gsm | 30 | 23 | 30 | 36 | 34 |

It is possible to make a 100% nonwoven web on the melt-blown system at production speeds. The PLA polymer that was dried plus PLA polymer that had been exposed to the moisture for months both processed well. This is not possible on other textile fiber spinning systems. Air pressure can virtually be eliminated and a usable web results requiring less energy. Fibers ranged form 1 micron to 20 microns based on visual exam. It will be possible to make sub-micron (e.g., nano) fibers on this spinning system and likely suitable for filtration and mask material. It is also likely suitable for growing media. It is expected that polymer additives or masterbatches will process well. Generally these are hydrophilic or hydrophobic additives pigments or antimicrobials. It is noted that non-dried polymer ran fine and that virtually no production modifications were required. The machine settings were similar to those used for PP polymer.

Example 5

Figure 11:
FIG. 11 is a photograph of a foam of the invention.

A blend of 93.6% Nature Works 6251D polylactide polymer, 1.78% Dow Corning Super Wetting Agent Q2-5211, and 4.6% Bergen Foamazol F70 was melted, mixed and extruded at a temperature of 150 degrees C. The Dow Corning Super Wetting Agent is a surfactant and the Bergen Foamazol is a citric acid sodium bicarbonate type chemical blowing agent. The resultant foam had a density of 10.47 Lbs/cubic foot with a water holding capacity after fully drained of 6.64 Lbs per cubic foot. Although not fully reticulated, open cell structure was observed and determined to be adequate for oxygen availability and root penetration for young plant propagation. A picture of the foam is shown in FIG. 11.

EQUIVALENTS

Those skilled in the art will recognize, or be able to ascertain using no more than routine experimentation, many equivalents to the specific embodiments of the invention described herein. It is, therefore, to be understood that the forgoing embodiments are presented by way of example only and that, within the scope of the appended claims and equivalents thereto, the invention may be practiced otherwise than as specifically described and claimed.

INCORPORATION BY REFERENCE

All of the US patents and US patent application Publications cited herein are hereby incorporated by reference.

I claim:

1. A method for producing a biodegradable, plant growth medium comprising the steps of:
    a. providing a biopolymer;
    b. melt processing the biopolymer into fibers; and
    c. dispensing the fibers into a shaped cavity mold, thereby forming a growth medium;
    d. wherein the fibers are in a melted or semi-melted state after the melt processing step, the fibers fuse directly together one to another at a plurality of contact points once dispensed, and the dispensed fibers conform to the shape of the cavity mold.

2. The method of claim 1, wherein the biopolymer is selected from the group consisting of polylactic acid and polyhydroxyalkanoates.

3. The method of claim 1, further comprising the step of adding a surfactant to the biopolymer.

4. The method of claim 3, wherein the surfactant is selected from the group consisting of ethylene oxide/propylene oxide block copolymers, glycerol, and lecithin.

5. The method of claim 1, further comprising the step of adding a wetting agent to the biopolymer.

6. The method of claim 5, wherein the wetting agent is selected from the group consisting of dialkyl sulfosuccinates, anionic sulfonated aliphatic esters or polyoxyethylene esters.

7. The method of claim 1, further comprising the steps of forming a channel for seed placement and root growth or dibbling the growth medium; and planting a seed within the growth medium.

8. The method of claim 1, further comprising the steps of slicing the growth medium; and planting a plantlet within the growth medium.

9. The method of claim 1, further comprising the step of introducing a gas during the melt processing.

10. The method of claim 9, wherein the gas is nitrogen.

11. The method of claim 1, further comprising the step of adding a chemical blowing agent to the biopolymer before the melt processing.

12. The method of claim 11, wherein the chemical blowing agent comprises citric acid and sodium bicarbonate.

13. The method of claim 1, wherein the growth medium has an at least partially reticulated, open cell structure.

14. The method of claim 1, wherein the shaped cavity mold is a propagating tray on a moving flat belt.

15. A plant growth medium prepared by a method comprising the steps of:
    a. providing a biopolymer;
    b. melt processing the biopolymer into fibers; and
    c. dispensing the fibers into a shaped cavity mold, thereby forming the growth medium;
    d. wherein the fibers are in a melted or semi-melted state after the melt processing step, the fibers fuse directly together one to another at a plurality of contact points once dispensed, and the dispensed fibers conform to the shape of the cavity mold.

* * * * *

UNITED STATES PATENT AND TRADEMARK OFFICE
CERTIFICATE OF CORRECTION

PATENT NO.        : 8,671,616 B2                                              Page 1 of 1
APPLICATION NO.   : 13/060130
DATED             : March 18, 2014
INVENTOR(S)       : T. Scott Kennedy It is certified that error appears in the above-identified patent and that said Letters Patent is hereby corrected as shown below:

In the Specification

At column 1, line 4, the following should be inserted as the first paragraph:

--GOVERNMENT LICENSE RIGHTS

This invention was made with government support under Grant No. 2009-33610-20032 awarded by the National Institute of Food and Agriculture of the United States Department of Agriculture. The government has certain rights in the invention.--

Signed and Sealed this
Seventeenth Day of June, 2014

Michelle K. Lee
*Deputy Director of the United States Patent and Trademark Office*